(12) United States Patent
Valderrama Chaparro

(10) Patent No.: US 12,209,453 B2
(45) Date of Patent: Jan. 28, 2025

(54) INTELLIGENT INSULATING CONSTRUCTION PARTITION AND CONSTRUCTION PROCESS

(71) Applicant: Mario Valderrama Chaparro, Bogota (CO)

(72) Inventor: Mario Valderrama Chaparro, Bogota (CO)

( * ) Notice: Subject to any disclaimer, the term of this patent is extended or adjusted under 35 U.S.C. 154(b) by 0 days.

(21) Appl. No.: 17/758,400

(22) PCT Filed: Nov. 5, 2021

(86) PCT No.: PCT/IB2021/060292
§ 371 (c)(1),
(2) Date: Jul. 5, 2022

(87) PCT Pub. No.: WO2023/079349
PCT Pub. Date: May 11, 2023

(65) Prior Publication Data
US 2024/0167326 A1 May 23, 2024

(51) Int. Cl.
*E06B 9/24* (2006.01)
*E06B 3/66* (2006.01)
(Continued)

(52) U.S. Cl.
CPC .............. *E06B 3/67* (2013.01); *E06B 3/6612* (2013.01); *E06B 3/663* (2013.01);
(Continued)

(58) Field of Classification Search
CPC .............. F24F 5/0075; F24F 2005/0078; F24F 2005/0082; E06B 3/67; E06B 3/26343;
(Continued)

(56) References Cited

U.S. PATENT DOCUMENTS

| 4,641,466 A * | 2/1987 | Raninen ................ F24F 5/0075 52/171.3 |
| 6,671,008 B1 * | 12/2003 | Li .......................... C09K 19/00 349/92 |

(Continued)

FOREIGN PATENT DOCUMENTS

| CN | 104775728 A | 7/2015 |
| CN | 210714383 U | 6/2020 |

*Primary Examiner* — Kyle J. Walraed-Sullivan
(74) *Attorney, Agent, or Firm* — Patenting Consulting Group; Roberto J. Rios

(57) ABSTRACT

A construction thermoacoustic partition to isolate areas from external or internal environments, refrigeration, and vehicles. The partition consists of a frame with airtightly glued insulating panels, transparent or not. If glass pane, frame, and panels are glued, they create an airtight chamber where pressure, light and solar tracking sensors are located. In its internal perimeter it has photovoltaic cells and a blind whose sheets are photovoltaic cells that make it self-sufficient in energy. The profile of the frame has channels to circulate air, where electric resistance is located, which in winter raises the temperature of the panel edges, in another, fans, temperature sensors, micro-pump, wires and reinforcements are located. The horizontal planes that create these channels have coextruded thermoacoustic bridges. It has a microprocessor with automatic or digitally modified instructions, with voice and remotely, so that components act in real time, depending to changes in the environment, which can be with Artificial Intelligence.

13 Claims, 9 Drawing Sheets

(51) Int. Cl.

| | | |
|---|---|---|
| *E06B 3/663* | (2006.01) | |
| *E06B 3/67* | (2006.01) | |
| *E06B 3/673* | (2006.01) | |
| *E06B 7/10* | (2006.01) | |
| *E06B 7/14* | (2006.01) | |
| *E06B 9/264* | (2006.01) | |
| *F24F 5/00* | (2006.01) | |
| *F24F 11/89* | (2018.01) | |
| *H02S 20/32* | (2014.01) | |
| *E06B 7/02* | (2006.01) | |

(52) U.S. Cl.
CPC ............ *E06B 3/67326* (2013.01); *E06B 7/10* (2013.01); *E06B 7/14* (2013.01); *E06B 9/264* (2013.01); *F24F 5/0075* (2013.01); *F24F 11/89* (2018.01); *H02S 20/32* (2014.12); *E06B 2007/023* (2013.01); *E06B 2007/026* (2013.01); *E06B 2009/2476* (2013.01); *E06B 2009/2643* (2013.01); *F24F 2005/0078* (2013.01)

(58) Field of Classification Search
CPC ................. E06B 3/6715; E06B 3/6722; E06B 2003/26325; E06B 2003/26327; E06B 3/663; E06B 3/6304; E06B 3/66309; E06B 3/66314; E06B 3/66323; E06B 3/67326; E06B 2007/023; E06B 2007/026; E06B 9/02; E06B 2009/2464; E06B 2009/2476; E06B 7/10
See application file for complete search history.

(56) References Cited

U.S. PATENT DOCUMENTS

| | | | | |
|---|---|---|---|---|
| 7,009,665 B2* | 3/2006 | Li | ............................ | F24S 50/80 349/92 |
| 11,953,798 B2* | 4/2024 | Rozbicki | .................... | E06B 9/24 |
| 2002/0085151 A1* | 7/2002 | Faris | .................. | G02B 27/0093 349/117 |
| 2004/0134482 A1* | 7/2004 | Jarvinen | ................... | E06B 9/92 126/573 |
| 2005/0007505 A1* | 1/2005 | Faris | ...................... | C09D 11/17 349/16 |
| 2005/0166495 A1* | 8/2005 | Cho | .......................... | E06B 7/12 52/204.5 |
| 2009/0139162 A1* | 6/2009 | Mancini | .................. | A62B 13/00 340/693.11 |
| 2009/0270023 A1* | 10/2009 | Bartmann | ............... | F24F 13/18 454/200 |
| 2010/0186734 A1* | 7/2010 | Arndt | ....................... | F24S 70/60 126/714 |
| 2010/0197214 A1* | 8/2010 | Geremia, Sr. | ........... | F24F 13/18 454/251 |
| 2012/0118359 A1* | 5/2012 | Battistutti | ............... | H02S 20/26 136/251 |
| 2012/0234033 A1* | 9/2012 | Kapany | .................. | F24F 5/0003 62/262 |
| 2012/0285666 A1* | 11/2012 | Klimaszewski | ........... | F24F 7/08 165/104.34 |
| 2014/0021903 A1* | 1/2014 | Seiling | .................. | H02J 7/0042 52/173.3 |
| 2014/0045419 A1* | 2/2014 | Bartmann | ................. | E06B 7/12 454/200 |
| 2016/0054023 A1* | 2/2016 | Baker | ................... | H05B 47/115 315/307 |
| 2016/0197220 A1* | 7/2016 | Greer | ........................ | E06B 5/00 136/244 |
| 2017/0292317 A1* | 10/2017 | Grosso | .................. | E06B 3/6722 |
| 2017/0328121 A1* | 11/2017 | Purdy | ...................... | E06B 3/677 |
| 2019/0128053 A1* | 5/2019 | Patel | ......................... | E06B 7/10 |
| 2019/0249487 A1* | 8/2019 | Trocme | .................. | H02S 20/23 |
| 2019/0267933 A1* | 8/2019 | Janowski | ................ | H02S 30/00 |
| 2019/0277522 A1* | 9/2019 | Soyyigit | ................. | F24F 11/89 |
| 2019/0296684 A1* | 9/2019 | Trocme | .................... | H02S 20/23 |
| 2020/0395885 A1* | 12/2020 | Janowski | ............... | E06B 3/4415 |
| 2022/0195788 A1* | 6/2022 | Lv | ............... | E06B 7/10 |
| 2022/0298850 A1* | 9/2022 | Shrivastava | ............. | E06B 9/24 |
| 2022/0360210 A1* | 11/2022 | Lyford | ................... | H01L 31/0547 |
| 2022/0364408 A1* | 11/2022 | Aharon | ................... | E04B 2/96 |
| 2023/0198454 A1* | 6/2023 | Coonen | ................. | H01L 31/056 136/246 |
| 2023/0287682 A1* | 9/2023 | Blundo | ................. | G16H 10/60 |

* cited by examiner

INTELLIGENT INSULATING CONSTRUCTION PARTITION AND CONSTRUCTION PROCESS

FIELD OF INVENTION

The field of invention is an intelligent noise and temperature insulating construction partition formed by parallel panels glued to a fixed or mobile frame; specifically it proposes glass pane panels fixed to a frame with sealants, to isolate buildings, vehicles and other enclosures from the internal climate and environment such as windows, doors, walls; the partition includes electronic means, its command, control and execution automatically and by the user in real time, and photovoltaic cells that make the partition self-sufficient and intelligent.

STATE OF THE ART

Several patents propose construction partitions, windows, and doors, as thermoacoustic insulation solutions and the use of photocells to take advantage of solar energy and means to control its components, as a known solution the following antecedents are mentioned among others:

Patent application CN210714383U "Solar intelligent shutter" proposes a blind with slats positioned over a window, whose slats are photovoltaic cells that generate energy for a motor and controls to rotate the slats, where the mechanism is self-sufficient and can be controlled remotely. This background does not specify a solution with double glass panes as the new patent, which increases energy efficiency, where the new solution has its own sealing mechanism and whose photovoltaic slats are contained between two glass panes and the frame, proposing a new way of solving the insulation problem. Patent application CN104775728A "Double-layer ventilation and thermal-insulation window and energy-saving ventilation and air conditioning system" proposes a system for ventilation of a room taking advantage of the heat generated by a double-glazed window to introduce or extract air from one place to another through pipelines and regulation mechanism. The invention differs from the previous one because the invention does not generate hot air, but instead takes advantage of sunlight to generate electricity, which regulates the temperature of the frame with air circulation in the contact spaces between the glass panes and the frame, without being a heating system.

Windows in the art are passive, with little or no reaction to changes on either side, because it has no means to changing their functions. The invention proposes a thermoacoustic partition to isolate rooms from external or internal environments, refrigeration, and vehicles, which changes its passive action to reaction in real time to external or internal changes in temperature and light through electronic means and communication.

In the art there are efficient thermoacoustic partitions to isolate spaces from noise and temperature that propose intelligent window configurations that are based on changes in opacity in glass pane with films and electricity; but the new invention proposes a less complex and simple solution that is executed with ordinary glass panes, presenting an insulating construction partition with parallel glass pane panels in window frames exposed to atmospheric and Environment changes, to heat and cold on both sides, depending on the season of the year, which is placed in a privileged position to take advantage of solar energy complemented by electronic means, its command, control and execution automatically or by the user in real time, and by photovoltaic cells, to optimize the insulating capacities of the partition.

BRIEF DESCRIPTION OF THE INVENTION

The invention comprises intelligent thermoacoustic building partitions to harness sunlight and optimize their insulating performance. It proposes a framework made up of profiles made of PVC, aluminum, wood, or any other appropriate material in the art, to which two or more panels are glued into, which may or may not be glass pane, and create an airtight chamber. The profiles that form the frame have internal channels for air circulation and external spaces where thermal and light sensors are located; actuators such as fans, micro pumps, vents are also located; and microprocessors, wires, braces, openings, and vents electrically powered. The planes that create these channels have thermoacoustic bridges built with geometry and material that is softer than the one of the frames. These elements and external spaces are enclosed by a cover-profile on all the external and internal perimeters, fixed to the body of the frame. Photovoltaic cells are located inside the airtight chamber attached to the internal walls of the frame exposed to the sun, which supply electricity to sensors that activate actuators via microprocessor instructions. In this space is also located the blind whose sheets are photovoltaic cells that generate electricity.

The photocells built into the device make it self-sufficient in energy and generate surpluses. It has a microprocessor with instructions for automatic action, modified digitally or by voice, through cell phones and the Internet, so that the components act in real time depending to changes in the environment and at the user's needs.

A window is exposed to atmospheric and Environment elements, to heat and cold on both sides, with the potential to harness solar energy for a profitable investment in various ways.

The insulating construction partition presented in one embodiment of the invention is a useful thermoacoustic window in rooms, buildings, workspaces that require insulating from noise and temperature from the outside or insulating of internal spaces in factories, hotels, meeting places or in mobile rooms.

The intelligent thermoacoustic window of the present invention has two or more glass panes with thermal and acoustic purposes depending to the following configurations:

The thermal function is determined with photocells on the internal perimeter, blind-photocell, fan, microprocessor, control, and algorithm that does not require a micropump. The acoustic function is configured with photocells on the internal perimeter, glass pane supports, fan, microprocessor, control, and algorithm; a vacuum in the airtight chamber that is maintained with a micro pump and does not have a blind.

DETAILED DESCRIPTION OF THE INVENTION

Figure 1:
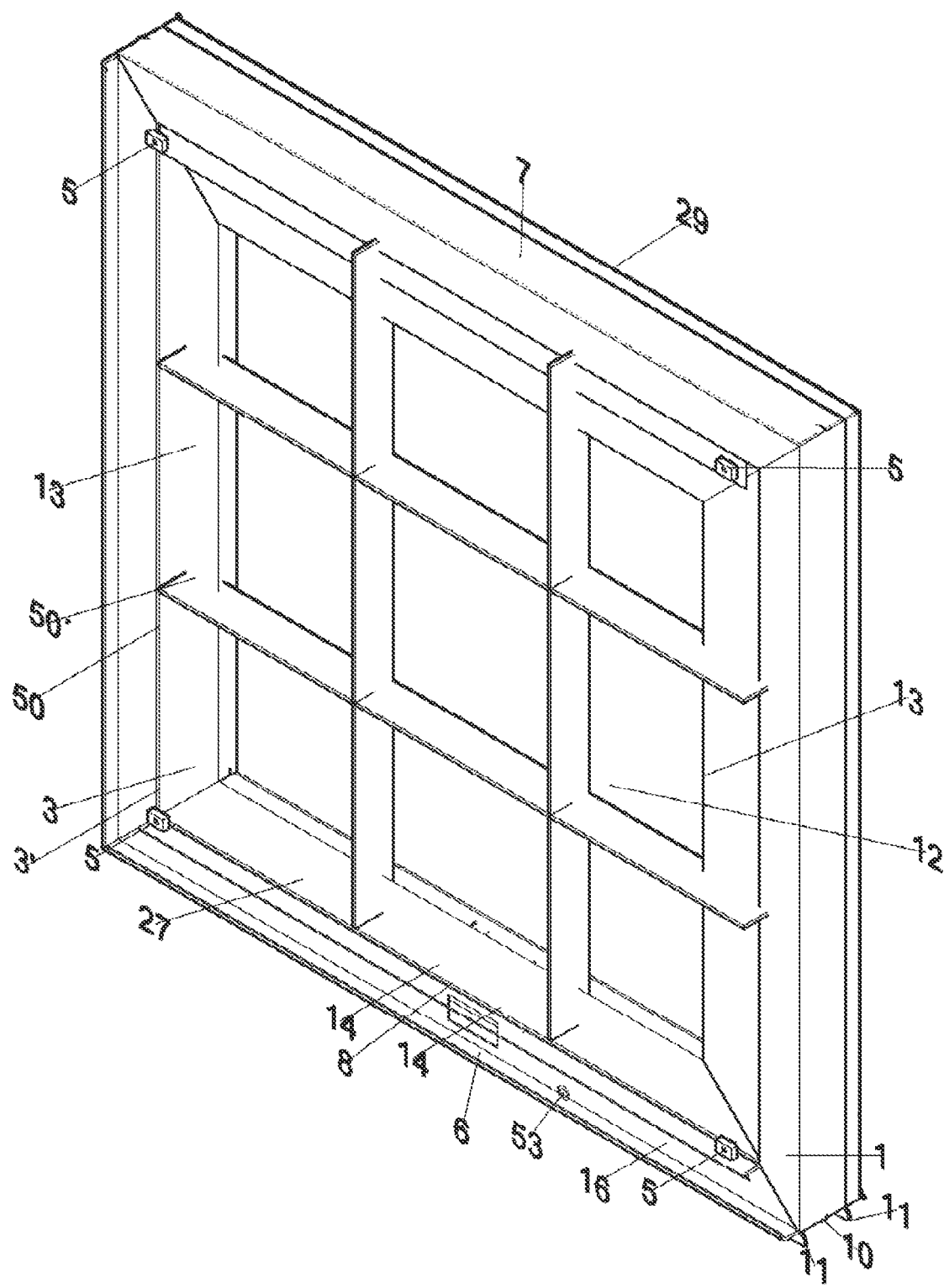
FIG. 1 shows a perspective view of a thermoacoustic window, with a frame onto which two panels airtightally glued, and form an airtight internal chamber (9) with openings for air inlet and outlet. It also shows sensors, fans, supports between the glass pane panels so that they do not deform or break due to atmospheric pressure once the air is extracted. It shows photovoltaic panels placed on the perimeter of the airtight internal part, on a fixed inclined plane.

The invention presents an intelligent thermoacoustic construction partition, preferably a window exposed to atmospheric and Environment elements, to heat and cold on both sides, depending on the season of year, which offers possibilities that solar energy can be used for a profitable investment. Said window is placed in a privileged position to take advantage of solar energy in various forms. Current designs do not incorporate the options offered by current technology.

The invention proposes a thermoacoustic partition to isolate closed rooms from external or internal hot or cold environments, in buildings, houses, workplaces, factories. Also applicable in refrigeration and vehicles. The partition consists of a frame made of PVC, aluminum, wood, or combinations of them, to which two or more insulating panels are glued, and if they are transparent, they are a thermoacoustic window that creates an airtight internal hole. Inside this hole, photovoltaic cells and pressure and light sensors are located on its internal perimeter.

Inside the frame there are independent channels to circulate air, by convection or forced, with electrically operated vents to open or close depending to instructions. In the independent channels are placed fans, micro vacuum pump, microprocessor, motor that drives the blind, wires and reinforcements, powered by electricity generated by photocells.

Within the space between panels and frame there are blinds or folding materials whose surfaces are photocells. The device is self-sufficient in energy and generates surpluses.

It has a microprocessor with instructions so that the indicated components act depending to the environment, which can be automatic, modified digitally or with voice. Environment conditions and user needs can make the device operable with Artificial Intelligence, with appropriate algorithms, not included in this invention.

The external and internal sides of the frame have covers on both sides, which cover the upper and lower external channels, the contact edges of glass panes and frame, and create space where components, controls and wires can be located. These covers have openings that coincide with the ventilation vents of the profile channels.

The profile is designed with the outlined characteristics, and the components to be incorporated are in the market at profitable prices, they are small, reliable and durable; They are part of various applications of daily and continuous use by people and in industries. An example is the cell phone that has pressure sensors, proximity sensors, microphones.

The profile, components and control commands have been incorporated into a system that optimizes the behavior of the partition in accord with climate and noise changes, which can be modified depending to circumstances and needs and create Artificial Intelligence (AI) to adjust automatically. The electricity to operate them is obtained with photovoltaic cells incorporated into the device, it is self-sufficient in energy consumption and can incorporate variables and additional elements. It is an automatic active window or at the user's will, whose instructions can be incorporated and modified before and after installation, with manual or voice controls. Algorithms can make it act with Artificial Intelligence (AI).

Description of Components

The intelligent thermoacoustic construction partition, preferably the intelligent window type, optimizes its performance depending to climatic and Environment changes on both sides to reduce costs, energy consumption and increase user comfort and well-being. Its operation is regulated by instructions to its components based on the information recorded by its sensors, depending to the standard method in these cases:

A. Intelligent thermoacoustic window information detectors composed of the following elements:

a. Temperature sensors, attached to the outer edges of the glass pane. It can be 1 or 2, located in a corner or in the center of the lower and upper glass pane edge. If only 1 place at the bottom, where temperature will be higher than the top edge.

b. Luminance sensor, located in the interior space created by the two panels of glass pane. With its information the blind will be activated.

c. Atmospheric pressure sensor. Located in the airtight chamber formed by panels and frame. It will be installed in windows whose main function is to isolate from noise. With its information the micro pump will be activated.

d. Photovoltaic inclination depending to the position of the sun. In miniature, the same as those used in photovoltaic cells.

e. Air inlet and outlet vents. There can be four, minimum two, located one in the lower and upper internal and external parts of the window. Its normal position is "closed". They open depending to the temperature of the glass pane edges, and the fan starts.

f. Wireless communication. Built in microprocessor.

B. Actuators that are command operators of the smart thermoacoustic window:

1. Fan. Placed inside the profile, in the lower channel, horizontally. It operates when the glass pane edge temperature is equal to the given value, for example 40° C. and it will stop when this temperature is 35° C.

2. Motor of the blind. It raises, lowers the blind and determines the slant of the slats when it is down, as when the blinds are adjusted manually. It can be a step motor or another that allows to act for a set time and stop depending to instructions.

3. Micro pump. Located in the lower channel of the frame profile, it connects to the space created by the frame and the two glass panes, making a seal on this wall by atmospheric pressure from the outside. This seal is part of a duct and valve that allows air to be removed from the space created between the two glass panes. When it creates vacuum, the duct closes. The valve made of flexible material that connects the micro pump to extract air.

4. Electric resistance located inside the channels of the profile.

5. Air inlet and outlet vents. They are elements that are glued to the inner walls of the lower channel of the window frame. It is a flat plate that slides through two slots and is kept closed by spring pressure, which permits to open when the fan starts operating. They can also be opened to ventilate the channels by non-forced air circulation, for example, if the temperature is 40° C.

6. Rotation and solar tracking. For better solar incidence on photovoltaic cells.

C. Instructions and communication of the intelligent thermoacoustic window. Microprocessor with instructions for:

1. Temperature sensors, attached to the edge of the glass pane, in contact with the frame.
   Summer, If TSe>TSi at 5° C. or If TSe≥35° C. Start Fan and open External Vents
   Winter, If TSe<TSi at 2° C. or If TSe≤−5° C. Start Fan and open Internal Vents
   Where: T=temperature, Se=External sensor, Si=Internal sensor, Re, Ri=External, internal vent 2. Luminance sensor, located in the interior space created by the two glass pane panels. With its information the blind will be activated.
   If SLx=40 Cds, Lower the blind. Where: SLx=Sensor lumens, cd=Candela.

3. Pressure sensor. Placed in the airtight chamber formed by the frame and the two panels.
   If SPa=1 bar, Start micro air pump. Stop if Spa=0.8 bar. Where: SPa=Pressure Sensor 4. Photovoltaic inclination depending to solar position. Inclination of the photovoltaic cells of the window.

5. Electric resistance located inside the upper channel of the profile.
   Winter, If TSe<TSi at 2° C. or If TSe−5° C. Start Heating Element, Fan and open Internal Vents.

6. Air inlet and outlet vents. There can be four, minimum two, located one in the lower and upper internal and external parts of the window. Its normal position is "closed". It opens depending to the temperature of the glass pane edges, while the fan is activated.

7. Wireless communicator. Built-in microprocessor or other element in the parallel windows.

8. Storage of data to be transmitted by cable or wireless and to be analyzed in external equipment.

D. Instructions to the microprocessor and communication

In the window there are sensors, actuators, microprocessor, and photovoltaic cells, as an autonomous unit. However, if it is a set of similarly positioned windows, it is not necessary for each window to have all the components. In that case there will be a main or base window that contains sensors, actuators, microprocessor and photovoltaic cells, from which instructions for parallel windows, which have conditions similar to the main one. In the parallel ones there will only be actuators and photovoltaic cells, which will be activated with the information from the sensors and instructions from the main one.

The number of parallel windows will depend on the capacity of the microprocessor and may have a specific printed card to fulfill the functions of the intelligent thermoacoustic window.

In a third embodiment, the microprocessor is a component capable of controlling, for example, 20, 50 or more windows with instructions on a board designed to fulfil the functions of an intelligent thermoacoustic window. In all these modalities, the operation and communication use available Internet of Things platforms.

The proposed intelligent thermoacoustic window has several options to function:

1. Thermal with photocells on the internal perimeter, blind-photocell, microprocessor, control, and algorithm. Not micro pump.
2. Acoustics with photocells on the internal perimeter, glass pane supports, microprocessor, control, and algorithm. Vacuum in airtight chamber and micro pump. Not blind.
3. Superimposed on installed window, without affecting window or facade Detailed Description of the Figures The following figures and description illustrate the ideas and features of the invention, which may be expressed and illustrated in various other ways and should therefore be taken as one of the best ways to explain the invention.

FIG. 1 shows a perspective view of a thermoacoustic window, with a frame (29) built with profiles to which an internal panel (50) and an external panel (50') are fixed, which can be made of internal glass pane (3) and an external glass pane (3') to form a thermoacoustic window. The features are shown in detail in FIG. 3A and FIG. 3B.

The horizontal planes of the profile with which the frame (29) of the window is built and which delimit the upper channel (1) and the lower channel (2) have flexible joints (10) of oval shape incorporated in the profile by coextrusion on its three surfaces. This flexible union has the purpose of damping vibrations and pressures between the panels and reducing thermal and acoustic fluxes.

The lower plane of the profile has seal gaskets (11) that serve as a seal between the thermoacoustic window and the structure where it is installed, it also has fixing means to the structure where it is installed, described in FIG. 6.

It has support grid (12) between the glass pane panels so that they do not deform or break due to atmospheric pressure once the air is extracted, in windows with the main function of noise insulation. These supports have coextruded soft materials on their planes for acoustic and thermal damping.

Figure 2:
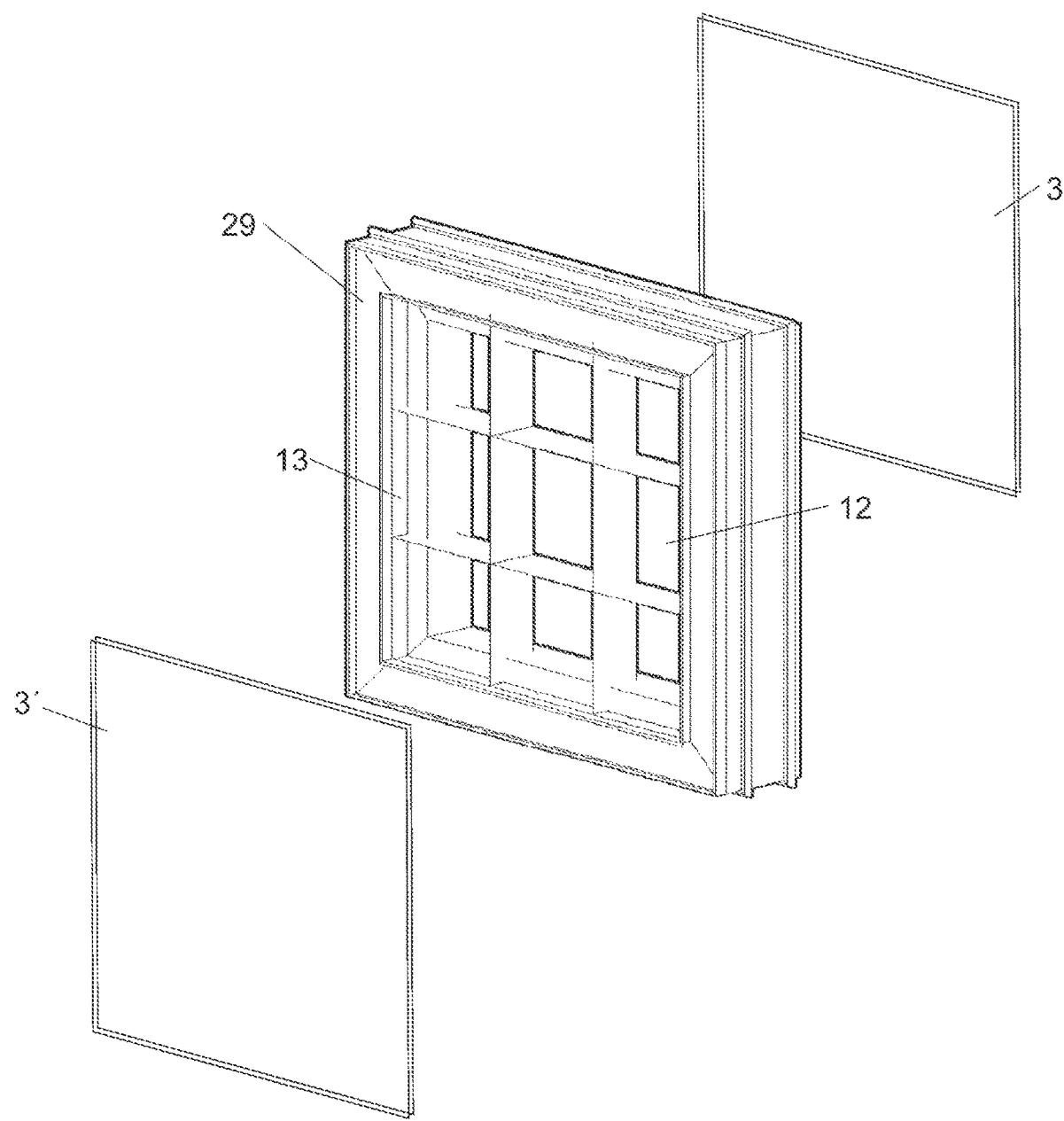
FIG. 2 shows a perspectives of the partition with glass pane panels, where the main components have been separated to better identify the elements described in FIG. 1 and their location.

FIG. 2 shows a perspective view of the partition with glass pane panels, where the internal glass pane (3) and the external glass pane (3') have been separated from the frame (29) to show the location of the elements described in FIG. 1.

Figure 3A:
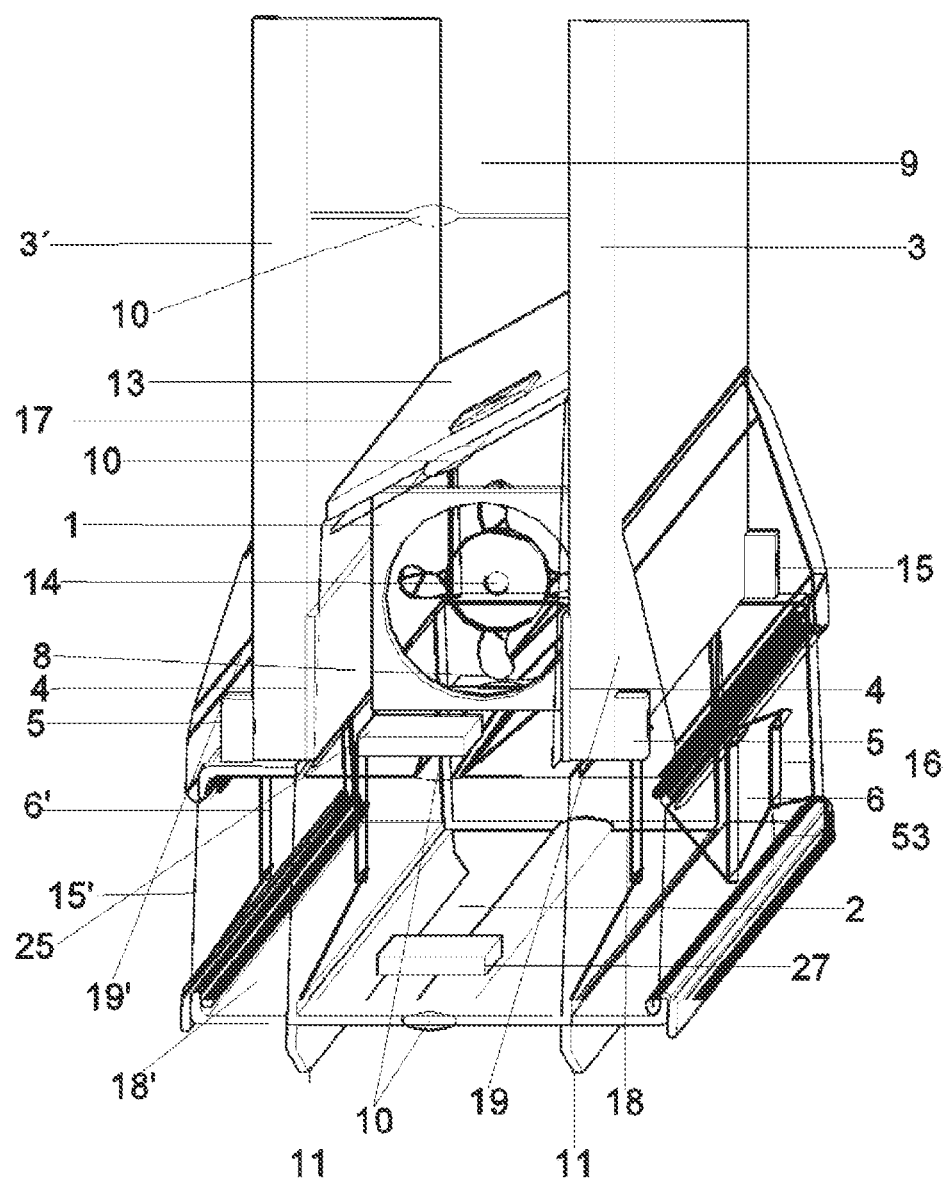
FIG. 3A and FIG. 3B show a sectional view of the window and the perspective details of the profile with which the frame that supports the panels and the electronic and command components is built.

FIG. 3A shows a perspective cross section of the profile of the lower part with which the thermo-acoustic window is created. It shows an airtight internal chamber (9) between the internal glass pane (3), the external glass pane (3') and the frame (29) that forms an upper channel (1) through which air circulates to cool the contact edges of the glass pane and framework. It also shows sealing-adhesive material (4) in the part of the profile that joins the glass pane panels to the frame (29).

The upper channel (1) is connected to the lower internal channel (2) through a hole (8), which in turn communicates with the internal and external side of the window through openings with lateral vents, a vent air inlet (6) and air outlet grid (7) of air, where the air flows by convection or forced, controlled electrically at will. In the airtight internal chamber (9) there are pressure and light sensors (17), panels with photovoltaic cells (13). In this airtight internal chamber (9) a vacuum is created, when the main function is acoustic insulation, in which case the support grid (12) is placed between the glass pane panels so that they do not deform or break down due to atmospheric pressure.

These support grids (12) have coextrusion for acoustic and thermal damping. In the lower internal channel (2) of the profile that forms the frame, there is a micro vacuum pump and its valve (not shown), microprocessor (27), wires, motors, micro vacuum pump, fan (14), which are communicated with the hole (8) in the horizontal plane of the two channels. Frame reinforcements are in the lower internal channel (2).

Figure 3B:
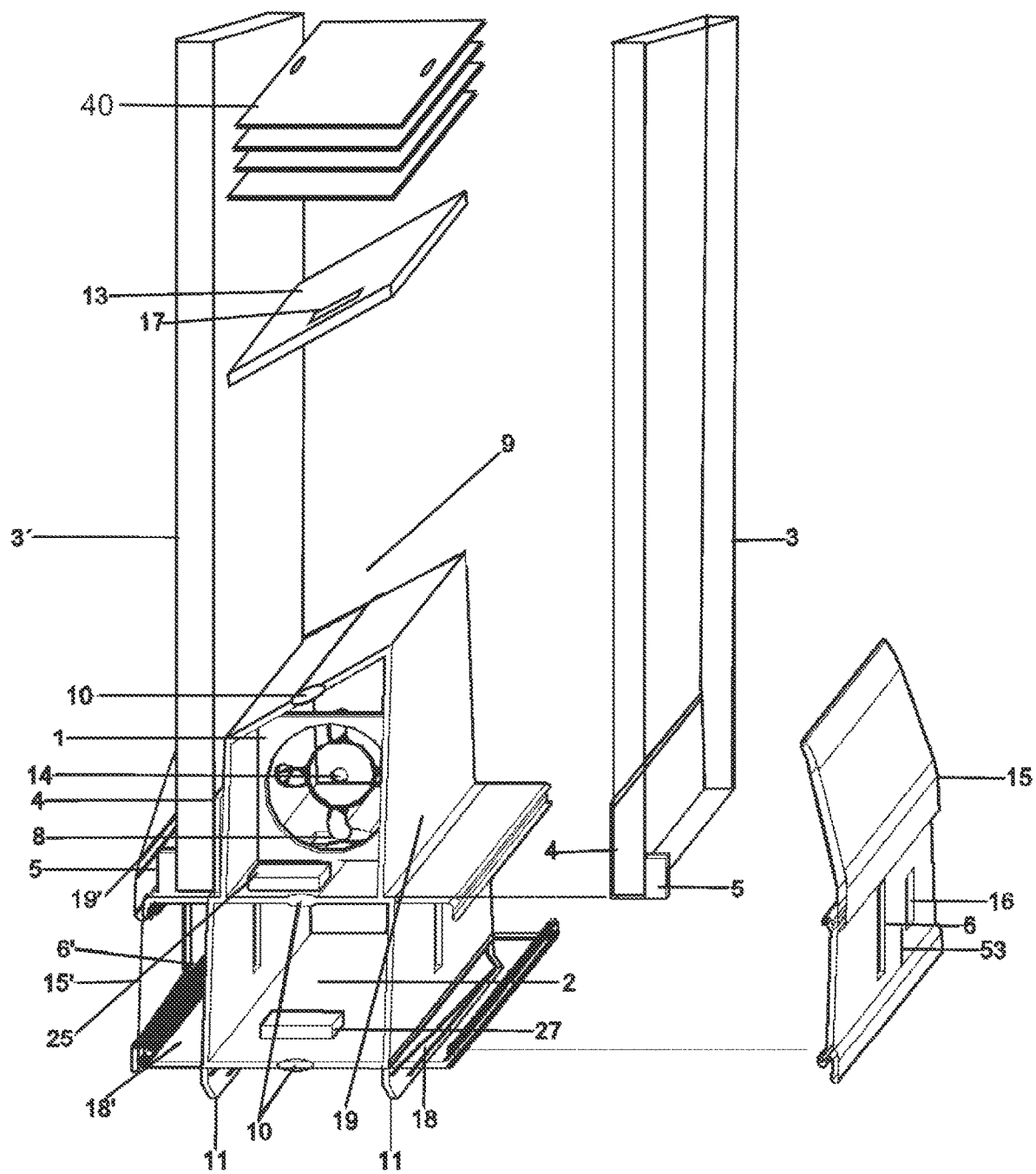

In each corner of the external side of the glass pane panes in the internal upper lateral void (18) and the external upper void (18'), which are covered by the internal cover profile (15) and external cover profile (15'), temperature sensors (5) attached to the internal glass pane (3) and to the external glass pane (3') are located, which send information to control and regulate the action of the fan (14), the inlet grid (6), external outlet grid (7'), internal outlet grid (7) and lowering, raising and unfolding the blind (40), shown in FIG. 3B. Ventilation can also be made by convection with the action of the inlet grid (6) and the external outlet grid (7'). This ventilation is important to dissipate the heat that accumulates in the panels exposed to the sun, reducing its migration to the frame and to the second panel. In addition, in thermoacoustic windows, the contact edges of the panels and glass pane heat up more than the rest of the panel and can affect the sealants-adhesives and violate the initial airtightness.

Wires and controls are in the internal upper lateral void (18) and internal lower void (19) to link sensors and actuators with the microprocessor (27). The external and internal cavities can be more than two on each side if the profile is designed for more than two panels.

Shows flexible joints (10) incorporated in the profile by coextrusion on its three surfaces. This flexible union has the purpose of damping vibrations and pressures between the panels and damping thermal and acoustic flows.

The window has panels with photovoltaic cells (13) placed on the perimeter of the airtight internal chamber (9), between the internal panel (50), external panel (50') opaque or transparent glass pane, internal pane (3) and external pane (3'), on the side of the frame (29) exposed to the sun, which generate electricity to operate control, sensors, to record instructions and regulate the actuators installed inside the profile, such as fans. The system has instructions and control parameters in a microprocessor (27), which can be modified directly or remotely by the user, by cell phone, depending on the environment and weather conditions by activating the fan, raising, lowering, folding the blind, at certain times, depending on light and temperature conditions. It also has a storage for the electricity generated by the photovoltaic cells, not shown. It has coextruded seal gaskets (11) that serve as a airtight seal between the thermoacoustic panel of frame(29) and the structure where it is installed. It also shows a container with a desiccant (25) located in the upper channel (1) that communicates with the airtight internal chamber (9) through an orifice with a airtight seal and that can be replaced by accessing from the upper internal lateral void (18) by opening (not shown), which is sealed with lid and gaskets.

FIG. 3B shows a cross section of the profile of the upper part of the exploded window to create the thermo-acoustic window. It shows the location of the blind (40) and part of its panels, which can be photovoltaic cells. It shows the external glass pane (3') and the internal glass pane (3) and the other parts refer to in FIG. 3A.

Figure 4:
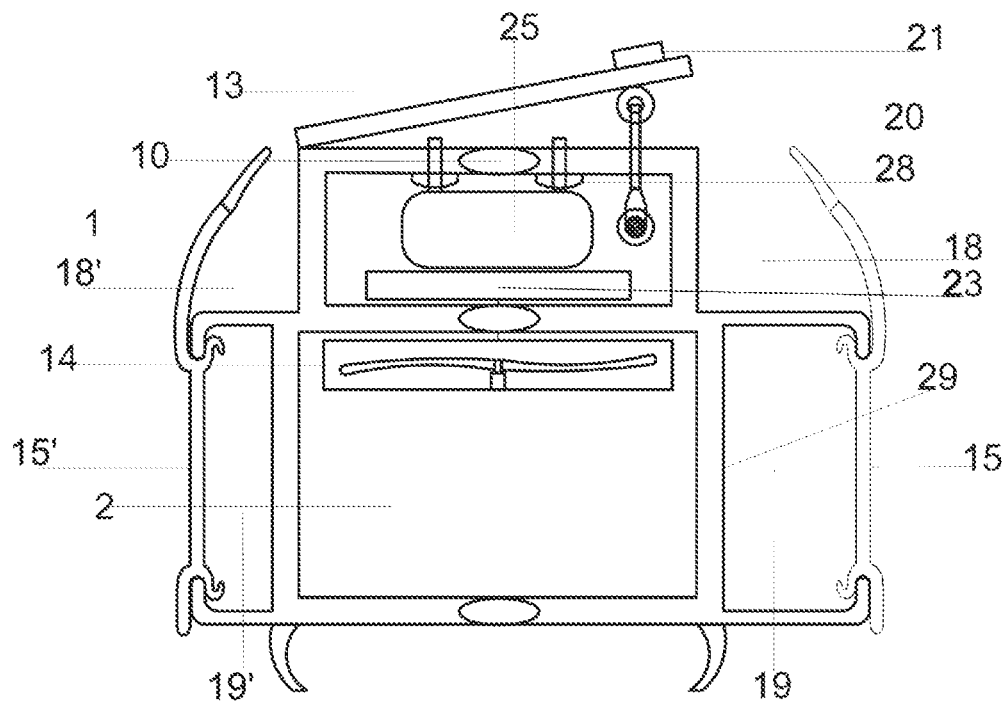
FIG. 4 shows another modality of the window, where the profile with which the frame that supports the panels and the electronic and control components is built has a horizontal plane where the photovoltaic cells are located.

FIG. 4 shows a cross section of the profile with which the frame (29) is built that serves as a support for the internal panel (50) of internal glass pane (3) and the external panel (50') of external glass pane (3') and they form the thermoacoustic window, with the same characteristics described in FIG. 3A, except that the first upper plane of separation of the panels is horizontal, that is, it forms an angle of 90° with them. On this horizontal plane, the photovoltaic cells (13) are accommodated, which will rotate to be in an optimal position to capture solar rays. The rotation and tracking of the sun are done by means of a rotation and solar tracking mechanism (20) and the solar tracking sensor (21) that is in the art. The fan (14) is in a horizontal position.

It also shows an electric resistance (23) through which current generated by photovoltaic cells located on the internal edges of the frame (29) circulates, in the closed space of the airtight internal chamber (9) and by the blind with its unfolded slats. This resistance heats the upper channel (1) and the lower channel (2) that is placed inside the profile, on which a fan will act to distribute the heat in the internal channels of the window and keep the edges of the glass pane at some temperature. larger than the window would be without this resistor; in this case the air intake grid (6) opens. The upper air outlet grid (7) remains closed.

This resistance is applicable in window conditions in a region of seasons, in winter, where the sun is four to five hours a day, with low incidence on the photovoltaic cells. Although the heat generated by the resistance is low, it is important to maintain the structural integrity of the window, since it prevents the glass pane-to-frame adhesives from reaching very low temperatures below zero, in addition to reducing heat loss through window. However, the resistance is not a source of heating, the room will have its own heating. It is a question of increasing the temperature of the glass pane panes and of the insulating glues, which tend to crystallize at low temperatures. For example, raising the edges by 1 to 3° C., instead of −10° C. rising to −7° C. would be enough to preserve adhesives.

Figure 5:
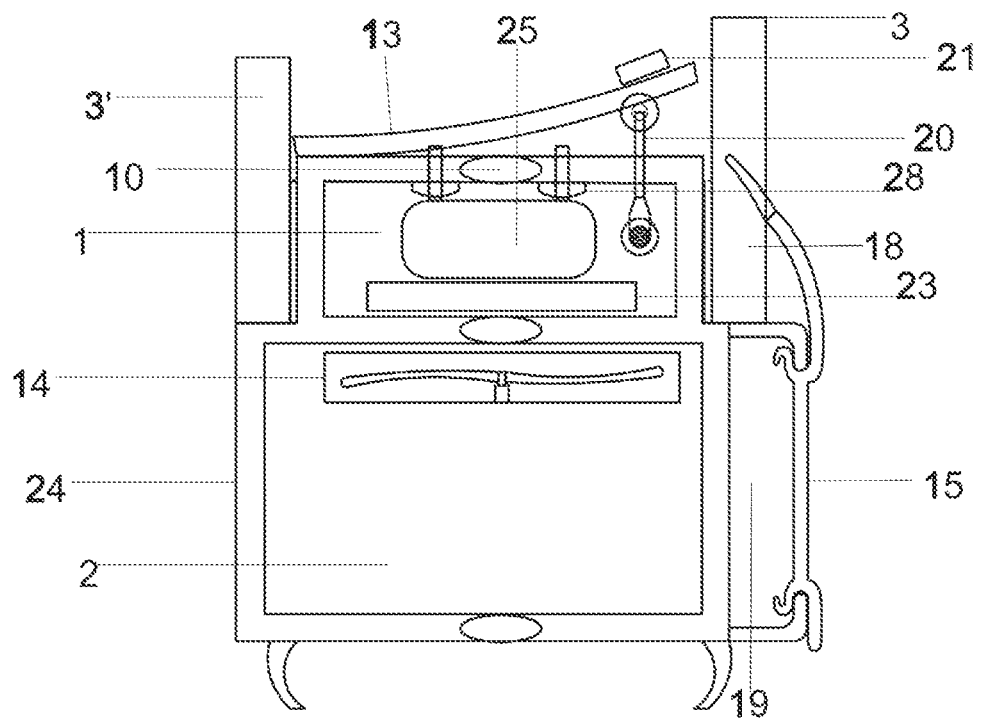
FIG. 5 shows another modality of the window to be laid over a window installed in a construction, without modifying the already installed one or the façade of the construction.

FIG. 5 shows another modality of the window to be placed over a window in a construction, without modifying the one already mounted. In this mode, the external plane is a flat contact surface (24) with the frame (29) of the window mounted to adhere it with glue, double-sided tape and other appropriate elements to affix and maintain a airtight seal. In this mode, the depth of the frame is adequate to accommodate it in the space that is generally found between the existing window and the internal edge of the supporting structure.

Figure 6A:
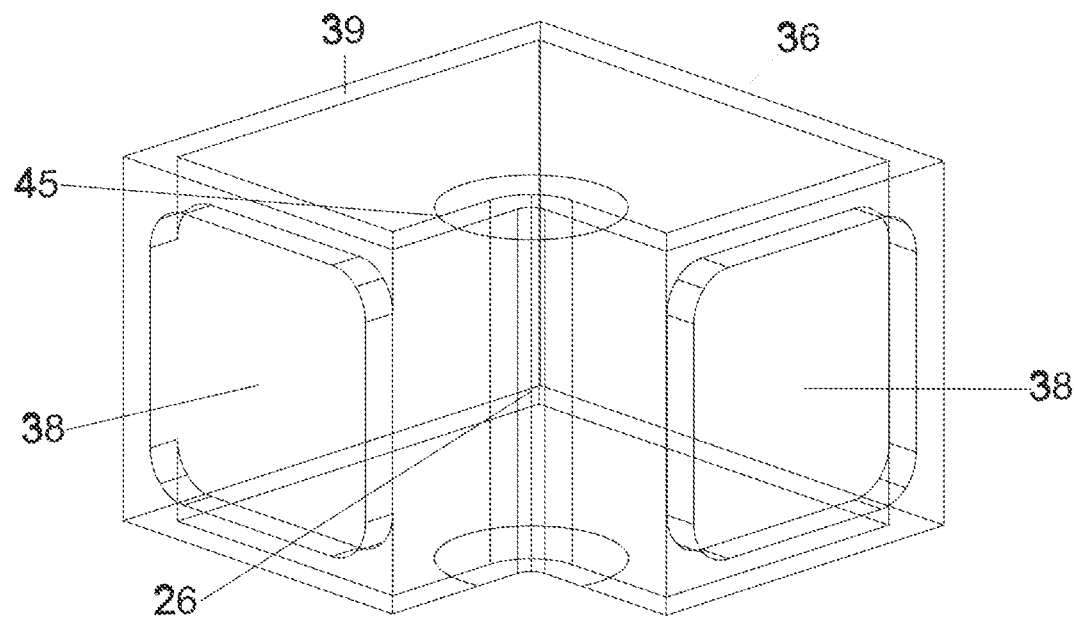
FIG. 6A shows the 90° airtight seal coupling (36) located in the internal corners of the upper internal channel (1) with soft coextrusion to ensure airtight closure with sealants and atmospheric pressure.

FIG. 6A shows a 90° airtight seal coupling (36) located in the corners that form the frame (29) to ensure airtight closing with sealants and atmospheric pressure in the internal corners of the upper channel (1) whose union forms the frame and airtight chamber. Although the corner contacts of the frame formed with PVC profiles are joined by heat, solvent and sealants to prevent moisture, particles and unwanted elements from entering the airtight internal chamber (9), when this internal chamber is evacuated seal (9) through the pump, it is necessary to maintain a airtight seal. To reinforce the closure, in addition to the previous closures, this airtight coupling is placed in the inner corner of the upper channel (1) close to the closed space. This coupling is composed of an area in the corner (26) formed by coextruded material softer than the walls (39) that secure it inside the upper channel (1), which by atmospheric pressure on this area in the corner (26) will maintain in position the sealants on this joint; the 90° airtight seal coupling (36) has spaces (38) to circulate air in the upper channel (1).

Figure 6B:
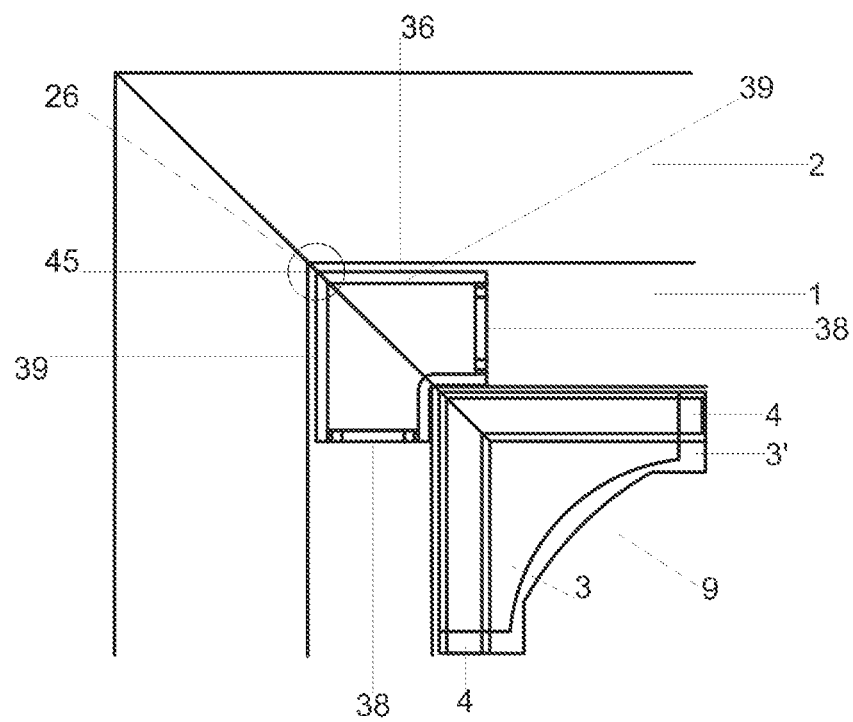
FIG. 6B shows the 90° airtight seal coupling (36) with coextrusion soft material (45) and its location in the internal corners of the upper channel.

FIG. 6B shows the location of the 90° airtight seal coupling (36) in the internal corners of the upper channel (1) whose union forms the frame (29) and the airtight closure, the area in the corner (26) of soft material (45). Other characteristics of this location are described in the previous figures.

Figure 7A:
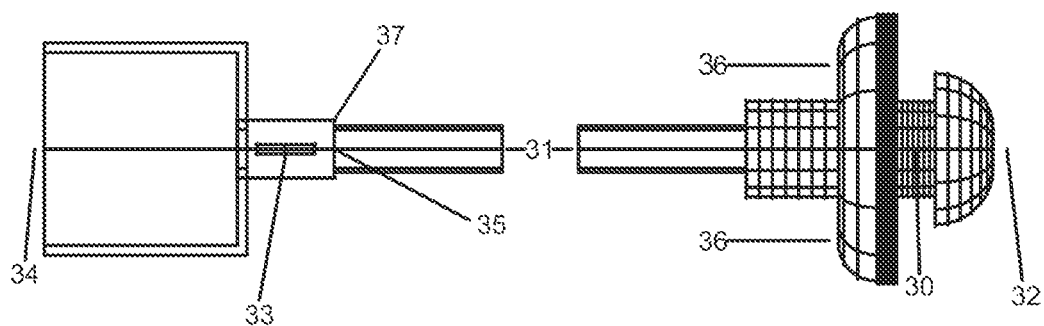
FIG. 7A, and FIG. 7B show one form of valve for evacuating, removing moisture and injecting fluids into the airtight hole.
Figure 7B:
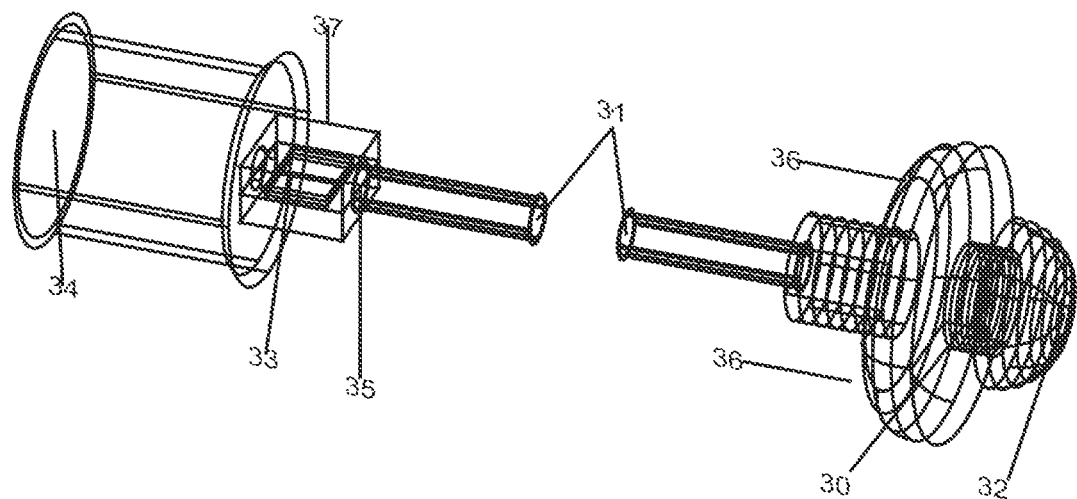
Figure 8:
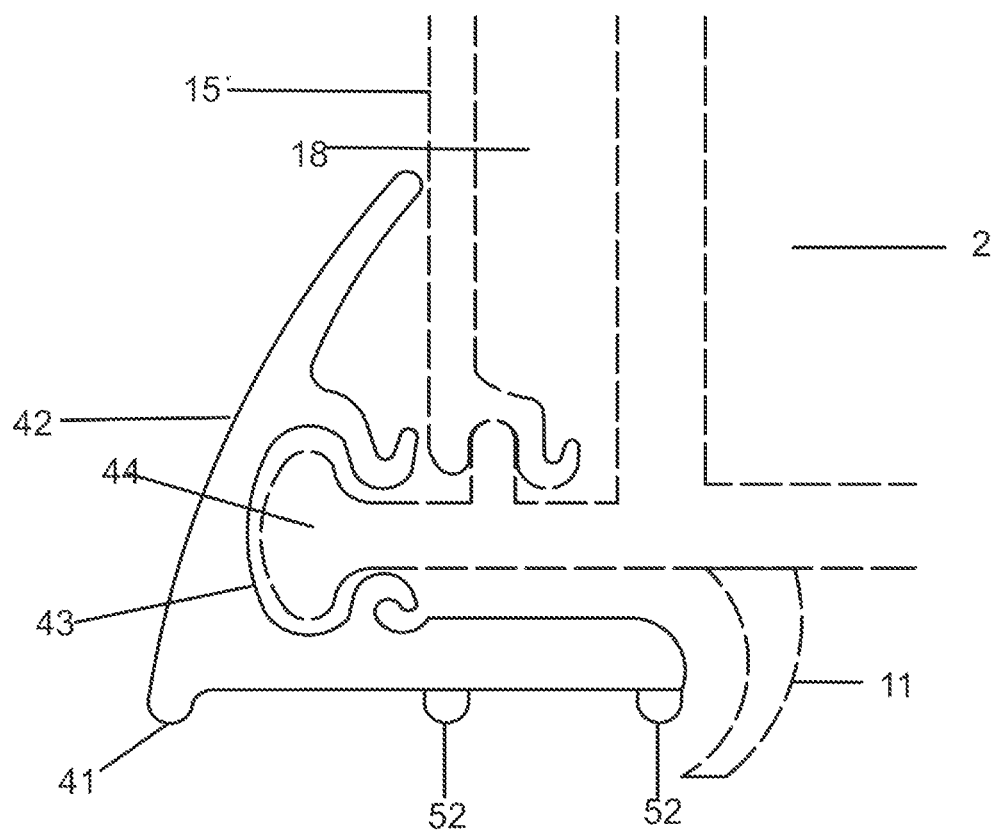
FIG. 8 shows a form of frame anchoring and fastening of the partition and window to the structure where it will be located.

FIG. 7A and FIG. 7B show a valve (37) that is fluid communication between the airtight internal chamber (9) and the outside, to extract air, remove moisture, defog, and add some fluid in the airtight internal chamber (9). One or several valves are placed in the frame, located as appropriate for their function. It is made up of a ring (30) that is inserted into a hole in the wall of the profile to hold it by the pliability of the material and atmospheric pressure, which acts on the external section of the coupling 90° hermetic seal (36) made of flexible material that is in contact with a plane of the frame (29), that seals by atmospheric pressure; the fluid communication continues through ducts (31) along the valve and tubes, from the hole (32) in the airtight internal chamber (9), to a coupling (34) cooperating with the one in the pump that pulls or inserts. Closing is done with the valve (37) by atmospheric pressure on the internal planes that form the hole (33) inside the valve, which has a cut off (35) in the wall where the duct (31) connects. The valve is opened by pressing the side walls of the valve so that the cutout (35) in the wall separates. Part of the ducts (31) can be solid or flexible. The cooperating coupling (34), the valve (37) and the ducts (31) are in the lower channel (2) and in the upper internal lateral void (18) which can be accessed by removing the cover-profile (15). FIG. 8 shows a way to anchor and fix the window to the supporting structure where it will be located. This anchor frame (41) consists of a hole (43) where the lower horizontal wall of the window frame penetrates by pressure, which has a cooperating coupling (44) along it, which secures the window to the anchor frame (41). This anchor frame (41) is secured to the perimeter of the supporting structure where the window will be placed, and it will be skidded against the anchor frame (41) so that the cooperating coupling (44) is inserted into the hole (43). The anchor frame profile (41) has an external surface (42), ends (52) of soft material that act as a seal when contacting the window frame (29) and with the supporting structure. In this way it is possible to remove the window for repair and replacement of the broken panel, leaving the anchor frame (41) in position, on which the window is placed back once repaired.

Figure 9A:
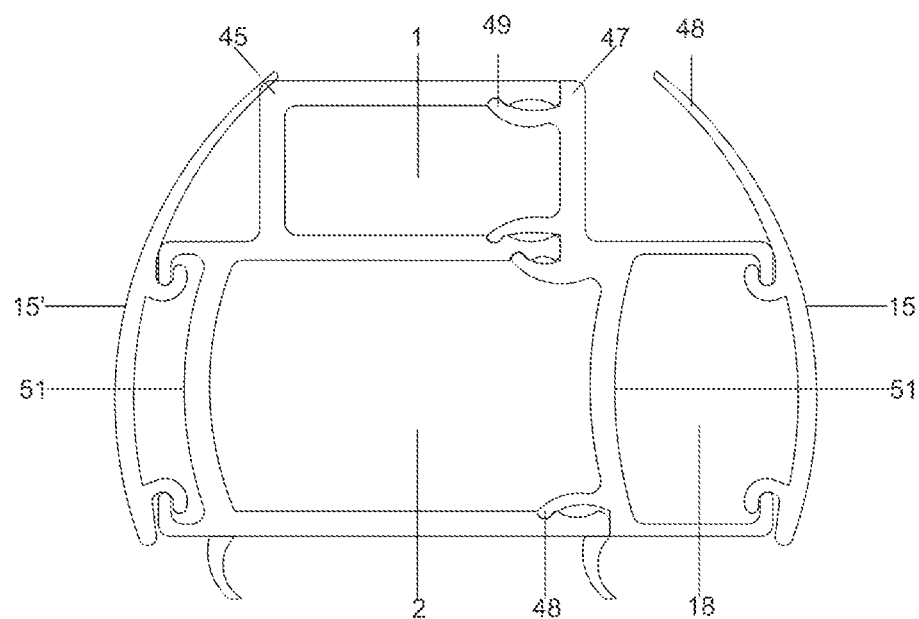
FIG. 9A and FIG. 9B show various ways of accessing the interior of the airtight internal chamber (9) of the partition. It also shows the modality where the planes of the internal cover-profile (15) and external cover (15'), and the vertical planes that form the lower channel (2) are curved.
Figure 9B:
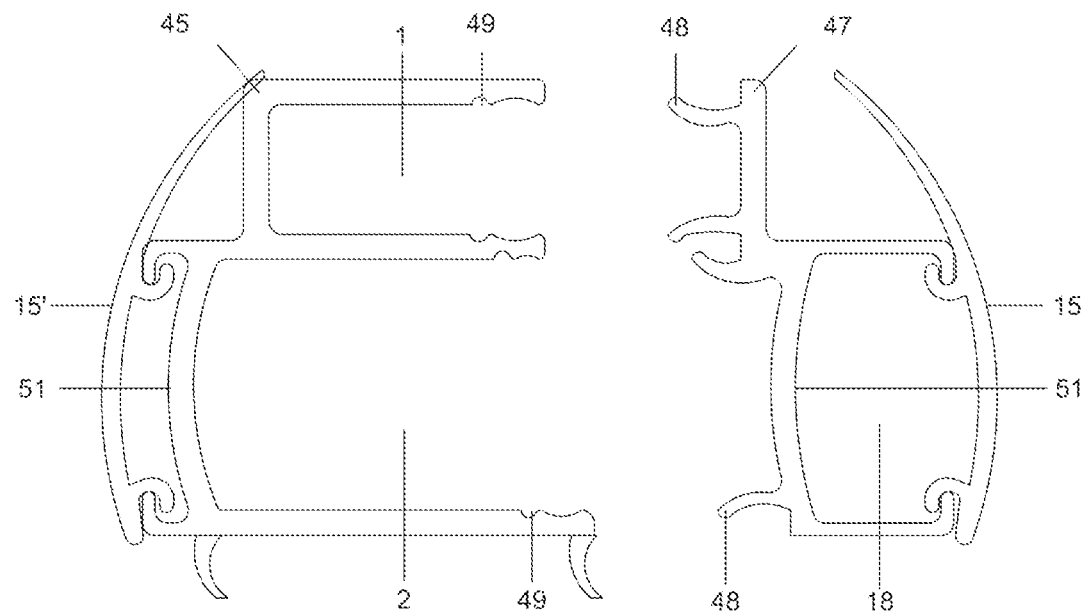

FIG. 9A shows a window modality where it is possible to separate the internal part of the window attached to the wall to access the interior of the closed section of the airtight internal chamber (9). FIG. 9B shows the separate installation mode of the internal part of the window attached to the wall. FIG. 9A and FIG. 9B show the general characteristics of the window described in the previous figures, the closed section formed by the upper channel (1), by the lower channel (2) and the internal upper lateral void (18) and the fixed section (46) to the structure and the removable section (47), the closing points (48) in the removable section (47) and closing points (49) in the fixed section (46). It also shows the modality where the planes of the cover profile (15), external cover profile (15'), and the vertical planes (51) that form the lower channel (2) are curved. The purpose of these curvatures is to reduce the incidence of noise waves and improve the acoustic insulation capacity.

Construction partitions and more specifically windows where the panels are glazed, due to their passive nature, are elements built and installed so that they remain in operation for many years without intervention for repairs, except for glass pane breakage and hardware failures. However, the thermoacoustic window of the invention has elements that, when converted from passive to active, may require repairing or updating some of its components, either due to damage, failure, or obsolescence. For example, new electronic, communication, and photocell components may be developed that make it convenient to change them. In the design of the proposed invention, it is possible to access most of the changes only by removing the internal cover-profile (15) to access motors, sensors, wires and connections. Fans and other elements located in the lower channel (2) can also be accessed through openings in their vertical planes, through which they were installed. However, to access the blind (40), to repair and change the photovoltaic cells, it is necessary to access the airtight internal chamber (9), which can be done in at least two ways: a) removing the inner glass pane (3) detaching it from the frame, with a steel rope as vehicle windshields are removed; b) separating the removable internal side of the window that closes the airtight internal chamber (9), with which the components for the required action are accessed. Once complete, place the internal area secured with the contact points around the entire frame. Sealants are placed at these closing points, but bonding should not be used, since would prevent opening the airtight internal chamber (9) on the next event. They can be complemented with small screws on the contact perimeter of the fixed part and the internal removable side. To repair the external panel (5'), the entire window is removed as indicated in FIG. 8.

These opening methods do not apply when the window is mainly used for acoustic insulation where the internal airtight chamber (9) is airtight. In this case, the internal glass pane (3) must be removed by detaching it from the frame. Once the task is accomplished, the internal glass pane is glued to the frame and a vacuum is made.

Production of the Intelligent Thermoacoustic Window

The intelligent thermoacoustic window is built in the following stages:

A. Manufacture PVC profiles, by extrusion of the material, the cover-profile (15), the external cover-profile (15'), the support grid (12), the internal panel (50) and the external panel (50') which can be internal glass pane (3) and external glass pane (3'). The horizontal planes that form the internal channels of the profile are coextruded with a general oval shape as an integral part of the profile, they are not placed afterwards, to dampen noise and interrupt thermal flow. They can be of the same modified softer material. The seal gaskets (11) between the window and the supporting structure are also coextruded.

B. Manufacture air inlet grid (6) and air outlet grid (7), sliders and open-close mechanism, to be inserted in cavities (16).

C. Assemble electronic components, instructions for actions to be carried out in microprocessor (27), activated by digital, remote and voice commands. Includes connection wires. This set is assembled in a separate specialized process and is delivered in a set to be installed inside the thermoacoustic window.

D. Build the thermoacoustic window, which will vary in some features if the window is for thermal or acoustic insulation, including:

a. Place glue or double-sided tape on the edges of the frame (29) or on the interior panel (50) and the exterior panel (50') parallel.

b. Seal and caulk joint corners of frame (29). This sealing is critical if the main purpose of the window is acoustic insulation. The stamps are made manually or with a robotic machine. Sealant-glue material (4) is placed on top of this seal to reinforce airtightness with the help of atmospheric pressure.

c. Install 90° airtight seal coupling (36) at each corner. Installation of micro vacuum pump, installation of supports, adhering glass pane to the frame. For windows whose main function is acoustic insulation, carry out a airtight seal test on the whole.

d. Place support grid (12) between glass pane panels, which are decorative; consisting of sheets of PVC, acrylic or glass pane, transparent, whose thickness can be 1 to 1.5 cm and width equal to the space that separates the internal glass pane panels (3) and external glass pane (3'), about 2 or 2.6 cm, equal to the dimension between the internal sides of the glass panes, plus addition in soft coextrusions to correct construction variations.

e. Locate one or more fans (14) in the lower channel (2) for air circulation, which communicates with the upper channel (1) via hole (8) on a horizontal plane to cool or heat contact edges of panels and frame. This circulation of air flow is by convection or forced.

f. Place reinforcements in the channel (2) and install the electronics, install the electric resistance (23) in the upper channel (1).

g. Place and connect temperature sensors (5), pressure and light sensors (17), fan (14), rotation and solar tracking mechanism (20), photovoltaic cells (13) and electric resistance (23) in the upper channel (1) of the profile.

h. Install a blind (40) in the airtight internal chamber (9) between the two glass pane panels, for thermoacoustic windows whose main function is thermal insulation; motor located lower channel (2).

i. Check assemblies, wires, microprocessor (27), controls. Perform tests.

The invention claimed is:

1. A thermo-acoustic insulating construction partition comprising:

a frame (29) built with profiles having vertical and horizontal surfaces that form internal channels including a lower channel (2) and an upper channel (1) where an insulating inner panel (50) and an insulating outer panel (50') are attached parallel to each other to vertical external surfaces of said upper channel (1) creating an airtight internal chamber (9) above said upper channel (1) and between said insulating inner panel and said insulating outer panel and the frame (29), said insulating inner panel and said insulating outer panel are transparent or non-transparent and are made from materials that are softer than a material from which the profiles were made;

a first horizontal surface, a second horizontal surface and a third horizontal surface, the lower channel (2) being enclosed by said first horizontal surface and said second horizontal surface and the upper channel (1) being enclosed by said third horizontal surface and said second horizontal surface, the airtight internal chamber (9) being located above said third horizontal surface, wherein said first, second, and third horizontal surfaces have flexible joints (10) that are coextruded with said first, second and third horizontal surfaces and said flexible joints (10) are made from a material that is softer than a material from which the horizontal surfaces were made;

photovoltaic cells (13) attached to internal surfaces of the frame (29) that enclose the airtight internal chamber (9), where temperature sensors (5), pressure and luminance sensors (17), and a solar tracking sensor (21) are located inside the airtight internal chamber (9);

an electric resistance (23) located inside the upper channel (1);

thermal sensors (5) attached to external surfaces of the insulating inner panel (50) and the insulating outer panel (50') and adjacent to an upper internal side void (18) and an upper external void (18'), respectively, wherein the thermal sensors (5) communicate with pressure and luminance sensors (17) to control fans (14), to open an air inlet grid (6) and an air outlet grid (7) for convection or forced ventilation of air, and to lower or raise a blind (40) and a solar tracking sensor (21);

a microprocessor (27) located in the lower channel (2) or in the upper internal side void (18) and being connected to said thermal sensors (5), said pressure and luminance sensors (17), and said solar tracking sensor (21), wherein said microprocessor (27) is configured to receive information from said thermal, pressure and luminance, and solar tracking sensors and actuate said fans (14), said air inlet grid (6), said air outlet grid (7), said blind (40) and said solar tracking sensor (21);

said fan (14), and said electric resistance (23) are connected to the photovoltaic cells (13) and to the microprocessor (27);

a 90° airtight seal coupling (36) having spaces (38) that allow the flow of air through said upper channel (1) and having an area in a corner (26) made from a coextruded material (45) softer than a material from which walls (39) of said 90° airtight seal coupling (36) is made, wherein said walls (39) secure said 90° airtight seal coupling (36) inside the upper channel (1) and the 90° airtight seal coupling (36) airtight seals a union of the corners of said upper channel (1) by atmospheric pressure;

an internal profile-cover (15) configured to cover said upper internal side void (18) and a lower internal void (19) located above said upper internal side void (18), and an external profile-cover (15') configured to cover said upper external void (18') and a lower external void (19') located above said upper external void (18'), wherein removal of said internal profile-cover (15) and said external profile-cover (15') allows access to electronic components (27);

a container with desiccant (25) located in the upper channel (1) and in communication with the airtight internal chamber (9);

connecting valves (37) provided between the airtight internal chamber (9) and an outside area to extract air, remove moisture, defog and allow addition of fluid in said airtight internal chamber (9); and an anchor frame (41) configured to fix the frame to a supporting structure.

2. The thermo-acoustic insulating construction partition according to claim 1, wherein heat from said electric resistance (23) is dissipated by the fan (14) throughout the upper channel (1) and a border where said insulating inner panel (50) and said insulating outer panel (50') are attached to said frame (29).

3. The thermo-acoustic insulating construction partition according to claim 1, wherein said upper channel (1) and said lower channel (2) are connected through a hole (8) and said lower channel (2) communicates with internal and external sides of a window through openings with lateral vents, said air inlet grid (6) and said air outlet grid (7) so that air flows by convection or forced.

4. The thermo-acoustic insulating construction partition according to claim 1, wherein coextruded flexible joints (10) are provided so that the external cover-profile (15') seals said upper external void (18') and said lower external void (19') and the internal cover-profile (15) seals said upper internal lateral void (18) and a lower internal void (19) to allow dampening vibrations and pressure between panels and to reduce thermal and acoustic flows.

5. The thermo-acoustic insulating construction partition according to claim 1, wherein said connecting valves (37) are inserted through a hole on a wall of a profile of the frame (29) and are affixed to said profile by a pliability of a material of a ring (30) and by atmospheric pressure that acts on an external section of said connecting valves (37); through ducts (31) are provided along the connecting valves (37) extending from a hole (32) provided on said external section of said connecting valves (37), through said airtight internal chamber (9), to a coupling (34) that couples to a pump, and said airtight internal chamber (9) has a support grid (12) provided between panels to prevent deformation or breaking of said panels due to atmospheric pressure.

6. The thermo-acoustic insulating construction partition according to claim 1, wherein said inner panel (50) comprises an inner glass pane (3) and said outer panel (50') comprises an outer glass pane (3'); the airtight internal chamber (9) between the frame (29), the internal glass pane (3) and the external glass pane (3') has a vacuum that is maintained with a pump located in the upper channel (1) or lower channel (2) and a grid (12) is provided between the inner and outer glass panes to avoid deformation and breakage of the glass panes.

7. The thermo-acoustic insulating construction partition according to claim 1, wherein a window comprising said frame (29) is superimposed to another window via said anchor frame (41) that has a hole (43) configured to receive a cooperating coupling (44) of the frame (29), said anchor frame (41) having an external surface (42) and two ends (52) that makes contact with said another window.

8. The thermo-acoustic insulating construction partition according to claim 1, wherein said container with desiccant (25) is in communication with the airtight internal chamber (9) through a hole with an airtight seal (28), said container with desiccant (25) being accessed through an opening on the internal upper side void (18).

9. A method of building a thermo-acoustic insulating construction partition, said method comprising the steps of:

manufacturing an internal cover-profile (15), an external cover-profile (15'), a support grid (12), an internal panel (50) and an external panel (50'), wherein horizontal surfaces that form internal channels are coextruded with an oval shape as an integral part of the horizontal surfaces; seal gaskets (11) are manufactured from coextruded material;

manufacturing an air inlet grid (6), an air outlet grid (7), sliders and an open-close mechanism configured to be inserted in cavities (16);

assembling electronic components, programming a microprocessor (27) with instructions and forming a set including the assembled electronic components, the programmed microprocessor (27) and connection wires, wherein the set is previously formed and provided as a set configured to be installed inside a thermoacoustic window; and building the thermoacoustic window by performing the following steps:

placing adhesive on edges of a frame (29) or on said interior panel (50) and said exterior panel (50');

sealing joint corners of the frame (29) and placing sealant material (4) on top of said joint corners to reinforce airtightness with assistance of atmospheric pressure;

installing a 90° airtight seal coupling (36) at each corner of said frame (29), installing a vacuum pump and supports, and attaching said interior panel (50) and said exterior panel (50') to said frame (29) in parallel to each other;

placing a support grid (12) between said interior panel (50) and said exterior panel (50'), a width of said support grid (12) is equal to a space that separates said interior panel (50) and said exterior panel (50');

placing at least one fan (14) in a lower channel (2) of said frame (29), wherein said lower channel (2) communicates with an upper channel (1) of said frame (29) via a hole (8) provided on a horizontal plane separating said lower channel (2) from said upper channel (1);

placing reinforcements inside the lower channel (2) and install said sets;

placing connecting inside said upper channel (1) a temperature sensors (5), a pressure and light sensors (17), a fan (14), photovoltaic cells (13) and an electric resistance (23); and installing a blind (40) in an airtight internal chamber (9) between said interior panel (50) and said exterior panel (50'), wherein a motor that actuates said blind (40) is located on the lower channel (2).

10. The method according to claim 9, wherein said internal cover-profile (15), said external cover-profile (15'), said support grid (12), said internal panel (50) and said external panel (50') are made from extruded PVC.

11. The method according to claim 9, wherein said internal panel (50) comprises an internal glass pane (3) and said external panel (50') comprises an external glass pane (3').

12. The method according to claim 9, wherein said support grid (12) is decorative.

13. The method according to claim 9, wherein said support grid (12) is made from acrylic or glass.

* * * * *